Patented July 18, 1939

2,166,339

UNITED STATES PATENT OFFICE 2,166,339

MANUFACTURE OF YEAST

Harold H. Browne, Brooklyn, N. Y.

No Drawing. Application February 23, 1937,
Serial No. 127,171

10 Claims. (Cl. 195—90)

This invention relates to the manufacture of yeast, and particularly to those conventional processes where propagation of yeast is initiated in a dilute wort, and thereafter feeding into this wort the balance of the mash containing nutrient matter in a more highly concentrated form, said wort being aerated during the process.

The conventional sacchariferous material is molasses which may be of any kind derived from the manufacture of sucrose, and is nearly always deficient in assimilable nitrogen and phosphorous so that it is customary to furnish both these elements to the yeast in the form of inorganic ammonium or phosphate ions, and in the quantities needed to ensure good propagation of a normal yeast.

It has been alleged that in these conventional processes, by-products of a deleterious nature, such as acids, are developed.

This invention has as an object to provide a process by means of which the nitrogen and phosphorous are supplied to the yeast in a form such that no deleterious acidity is developed during the propagation, said form being the compounds formed by certain amidines, such as guanidine and guanylguanidine, with the phosphoric acids including hypophosphoric acid. The guanidine compounds of ortho-phosphoric acid are of the type represented by the formula $(CH_5N_3)_n H_3PO_4$ where $n$ may equal 1, 2, or 3, and for the purpose of this invention are characterized by their high nitrogen to phosphorous ratio, and may be totally assimilated by the yeast, leaving no deleterious by-products.

In carrying out the present invention, a suitable sugar solution of the required specific gravity may be made from any sugar-containing material such as molasses, the resulting solutions adjusted to a hydrogen-ion concentration within the known operative limits for yeast propagation, and propagation initiated in the media, all in any manner known to those skilled in the art. The guanidine-phosphates may be added in the quantity or form required, either before seeding, or during the propagation period. In order to furnish nitrogen more rapidly to the yeast when so required, material containing guanidinase may be supplied during the propagation period, such material is an extract from certain species of mold.

The present invention comprises not merely the use of these guanidine compounds, with or without guanidinase, as a source of nitrogen and phosphorous, but a sequential and correlated control of the various conditions of the propagating liquid.

Having thus described my invention, what I wish to particularly point out and claim as new, and to secure by Letters Patent is:

1. A process for manufacturing yeast, comprising propagating yeast in a sacchariferous solution containing compounds of the amidines and ortho-phosphoric acid.

2. A process for manufacturing yeast, comprising propagating yeast in a yeast nutrient solution containing compounds of guanidine and phosphoric acid.

3. A process for manufacturing yeast, comprising propagating yeast in a yeast nutrient solution containing compounds of guanidine and phosphoric acid to which guanidinase has been added.

4. A process for manufacturing yeast, comprising propagating yeast in a yeast nutrient solution containing compounds of guanylguanidine and phosphoric acid.

5. A process for manufacturing yeast, comprising propagating yeast in a yeast nutrient solution containing compounds of guanylguanidine and phosphoric acid to which guanidinase has been added.

6. A process for manufacturing yeast, comprising propagating yeast in a yeast nutrient solution and adding compounds of guanidine and phosphoric acid to said nutrient solution during the propagating period.

7. A process for manufacturing yeast, comprising propagating yeast in a yeast nutrient solution and adding compounds of guanidine and phosphoric acid together with guanidinase containing material during the propagating period.

8. A process for manufacturing yeast, comprising propagating yeast in a yeast nutrient solution and adding compounds of guanylguanidine and phosphoric acid together with guanidinase containing material to said nutrient solution during the propagating period.

9. A process for manufacturing yeast, comprising propagating yeast in a yeast nutrient solution and adding compounds of guanidine and hypo-phosphoric acid together with guanidinase containing material to said nutrient solution during the propagating period.

10. A process for manufacturing yeast, comprising propagating yeast in a yeast nutrient solution and adding compounds of guanidine and hypo-phosphoric acid to said nutrient solution during the propogating period.

HAROLD H. BROWNE.